US006910135B1

(12) United States Patent
Grainger

(10) Patent No.: US 6,910,135 B1
(45) Date of Patent: Jun. 21, 2005

(54) METHOD AND APPARATUS FOR AN INTRUDER DETECTION REPORTING AND RESPONSE SYSTEM

(75) Inventor: Steven Phillip Grainger, Lowell, MA (US)

(73) Assignees: Verizon Corporate Services Group Inc., New York, NY (US); BBNT Solutions LLC, Cambridge, MA (US); Genuity Inc., Burlington, MA (US)

(*) Notice: Subject to any disclaimer, the term of this patent is extended or adjusted under 35 U.S.C. 154(b) by 0 days.

(21) Appl. No.: 09/348,377

(22) Filed: Jul. 7, 1999

(51) Int. Cl.$^7$ .............................. H04L 9/00; G06F 11/00

(52) U.S. Cl. ...................... 713/201; 713/201; 709/202; 709/223; 709/224

(58) Field of Search .............................. 713/200, 201; 709/223, 224, 202

(56) References Cited

U.S. PATENT DOCUMENTS

| | | | | | |
|---|---|---|---|---|---|
| 5,414,833 | A | * | 5/1995 | Hershey et al. | 395/575 |
| 5,557,742 | A | * | 9/1996 | Smaha et al. | 395/186 |
| 5,561,769 | A | * | 10/1996 | Kumar et al. | 395/200.05 |
| 5,621,889 | A | * | 4/1997 | Lermuzeaux et al. | 395/186 |
| 5,905,859 | A | * | 5/1999 | Holloway et al. | 395/187.01 |
| 6,088,804 | A | * | 7/2000 | Hill et al. | 713/201 |
| 6,125,390 | A | * | 9/2000 | Touboul | 709/223 |
| 6,249,755 | B1 | * | 6/2001 | Yemini et al. | 702/183 |
| 6,347,374 | B1 | * | 2/2002 | Drake et al. | 713/200 |
| 6,408,391 | B1 | * | 6/2002 | Huff et al. | 713/201 |
| 6,530,024 | B1 | * | 3/2003 | Proctor | 713/201 |
| 6,553,403 | B1 | * | 4/2003 | Jarriel et al. | 709/202 |

OTHER PUBLICATIONS

Y. Frank You, Fengmin Gong, Chandru Sargor, Architecture Design of a Scalable Intrusion Detection System for the Emerging Network Infrastructure, DARPA E296, Rom Lab, Apr. 1997.*

* cited by examiner

Primary Examiner—Ayaz Sheikh
Assistant Examiner—Taghi T. Arani
(74) Attorney, Agent, or Firm—Leonard C. Suchtya, Esq.; Joel Wall, Esq.; Finnegan Henderson et al

(57) ABSTRACT

A method and apparatus is disclosed for improving the security of computer networks by providing a means operating passively on the network for detecting, reporting and responding to intruders. The system is comprised of a plurality of intruder sensor client computers and associated event correlation engines. Resident in the memory of the client computer and operating in the background is a Tactical Internet Device Protection (TIDP) component consisting of a passive intruder detector and a security Management Information Base (MIB). The passive intruder detector component of the TIDP passively monitors operations performed on the client computer and emits a Simple Network Management Protocol (SNMP) trap to an event correlation engine when it identifies a suspected intruder. The event correlation engine, through the use of a behavior model loaded in its memory, determines whether the user's activities are innocent or those of a perspective intruder. When the event correlation engine is unable to classify a user based on a single trap message, it can request historical information from the security MIB, a database of the operating history of the client computer including a chronology of the illegal operations performed on the client. Once the event correlation engine determines that an intruder is located at an associated client workstation, it generates a status message and transmits the message to all of its subscribers, informing them of the presence and location of a suspected intruder.

45 Claims, 4 Drawing Sheets

METHOD AND APPARATUS FOR AN INTRUDER DETECTION REPORTING AND RESPONSE SYSTEM

STATEMENT REGARDING FEDERALLY SPONSORED RESEARCH OR DEVELOPMENT

The present invention was made partly with government funds under DARPA/ITO Contract DAAB07-99-3-K007. The government may have certain rights in the invention.

FIELD OF THE INVENTION

The present invention relates to the field of distributed computer systems and more specifically to distributed computer systems and methods for detecting, reporting and responding to computer system intruders.

DESCRIPTION OF THE PRIOR ART

Every day, more and more people are beginning to realize the wealth of information that can be stored on a distributed computer network and the ease with which that information can be retrieved by network users. The popularity of the Internet has led to the emergence of the largest and most diverse collection of information the World has ever known. Users of all walks of life can access the most up-to-date information on topics ranging from the Paris nightlife to the latest procedures for performing lumbar/thoracic surgery. The Internet's notoriety has also led to the advent of thousands of smaller intranets with a more centralized purpose and focused collection of users. These intranets are finding increasing favor from those organizations interested in maintaining a higher degree of control over information stored on the computer network in support of a more limited objective. Brokerage houses, start-up companies and hi-tech firms, for example, have expanded their suites of information resources to include specialized intranets.

The evolution of distributed computer networks has brought with it an equally stunning advancement in the manner in which these networks are interconnected. The earliest computer networks were wired networks wherein an electronic signal flowed from one computer to another across a physical medium such as a copper wire or fiber optic. Today, computers are 'connected' via wireless interfaces wherein a signal flows from one computer to the next over the airwaves at a radio frequency. Devices in a wireless network can move freely about and can tap into a source of information at anytime and from anyplace. Even today wireless networks operating at RF frequencies are unable to handle large amounts of data with the same level of efficiency as wired networks. Moreover, as the quantity of information on the wireless network increases, the quality of the channel deteriorates. The heavy data traffic also increases the transmission errors and consequently reduces throughput. Because high error rates are unacceptable, the transmission rates must be lowered and in effect, the bandwidth reduced in order to bring the error rate within acceptable limits.

Despite the relative difficulty of transmitting large amounts of data over wireless networks, they continue to enjoy widespread popularity due primarily to the high degree of accessibility that they provide. Unfortunately, this additional flexibility comes with a price as wireless networks also provide greater opportunities for "hackers" or intruders to impermissibly infiltrate computer networks. The explosive growth of the Internet and other computer networks, together with the volume and value of the information found in their databases, necessitates a mechanism for providing a level of data security impervious to such threats. This requirement has led to the implementation of a complex series of authentication procedures and lock-out schemes to protect the integrity and control access to information stored on computer networks. This correspondingly has led to the development of intruder detection systems to limit network access to authorized users and to quickly identify unauthorized users who somehow obtain access.

Traditional Intruder Detection Systems (IDS) identify potential intruders by looking at data packets transmitted on a network and making determinations as to whether or not the packets are suspicious based on pattern matching and a collection of generalized rules. To achieve the maximum effectiveness, these IDSs typically examined and processed every data packet transmitted on the network. In the course of performing the intruder detection function, these prior art systems often created an enormous processing overhead that had a detrimental effect on system performance. These systems were also handicapped by the fact they relied on static pattern matching libraries and fixed detection identification rules. As new methods of "hacking" were developed and intruders became more sophisticated, these rules and patterns eventually became outdated and the IDS more vulnerable to circumvention by intruders. Moreover, as networks develop the ability to communicate faster, the inefficient processing methodologies of the conventional IDSs risk the possibility of significantly degrading system performance and compromising its effectiveness.

The performance drawbacks of conventional IDSs are additionally highlighted when the IDS is hosted on a wireless computer network. Here, the available bandwidth is much more limited than with conventional wired networks, further restricting the processing overhead that can be dedicated to the IDS.

Another problem with current IDSs is their ability to consistently and effectively distinguish actual intruders from valid system users. For example, when a valid user logging onto a network mistakenly types "TIFER" instead of "TIGER" as his/her password, it is more likely that that particular user is a valid user that has simply fat fingered one letter of their password. On the other hand, when a user enters passwords that are completely unrelated to the valid password or when they enter several incorrect passwords in a short duration, it is more likely that that particular user could be an intruder. Existing systems are ill-prepared to differentiate between the two cases and consequently may report both as intruders when in reality, one is more likely an intruder than the other.

The net effect is that the output of these systems is unreliable, voluminous and consequently often ignored by security personnel. While it is clear that numerous methods thus far have been proposed for protecting networks from unauthorized access, as a general rule those methods tend to be unsophisticated, inefficient and incapable of effectively securing a network against the efforts of the modern-day hacker. Furthermore, the processing burden of current intruder detection systems makes them impractical for use with wireless networks, where they are arguably needed the most.

There is a need therefore for an improved apparatus and method for passively detecting intruders on a wireless computer network that requires very little bandwidth; operates in the background and is therefore passive and invisible to the user; is adaptable to differing threats and evolving threat environments; and is capable of notifying other clients and servers of a suspected intruder without operator intervention.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

SUMMARY OF THE INVENTION

Systems and methods consistent in this invention increase the security of computer networks through the use of a passive intruder detector operating on a user terminal. This system is comprised of a plurality of intruder sensor client computers and associated event correlation engines. Resident in the memory of the client computer and operating in the background is a Tactical Internet Device Protection (TIDP) component consisting of a passive intruder detector and a security Management Information Base (MIB). The passive intruder detector component of the TIDP passively monitors operations performed on the client computer and emits a Simple Network Management Protocol (SNMP) trap to an event correlation engine when it identifies a suspected intruder. The event correlation engine is a rule-based behavior model capable of identifying a wide range of user activities. It can be customized to accommodate many different threat environments through the use of a behavior model loaded in its memory. When the event correlation engine is unable to classify a user based on a single trap message, it can request historical information from the security MIB, a database of the operating history of the client computer including a chronology of the illegal operations performed on the client. Once the event correlation engine determines that an intruder is located at an associated client workstation, it generates a status message and transmits the message to all of its subscribers, informing them of the presence and location of a suspected intruder.

BRIEF DESCRIPTION OF THE DRAWINGS

The accompanying drawings, that are incorporated in and constitute a part of the specification, illustrate presently preferred embodiments of the invention and, together with the general description given above and the detailed description of the preferred embodiments given below, serve to explain the principles of the invention.

DETAILED DESCRIPTION

System Overview

Figure 1:
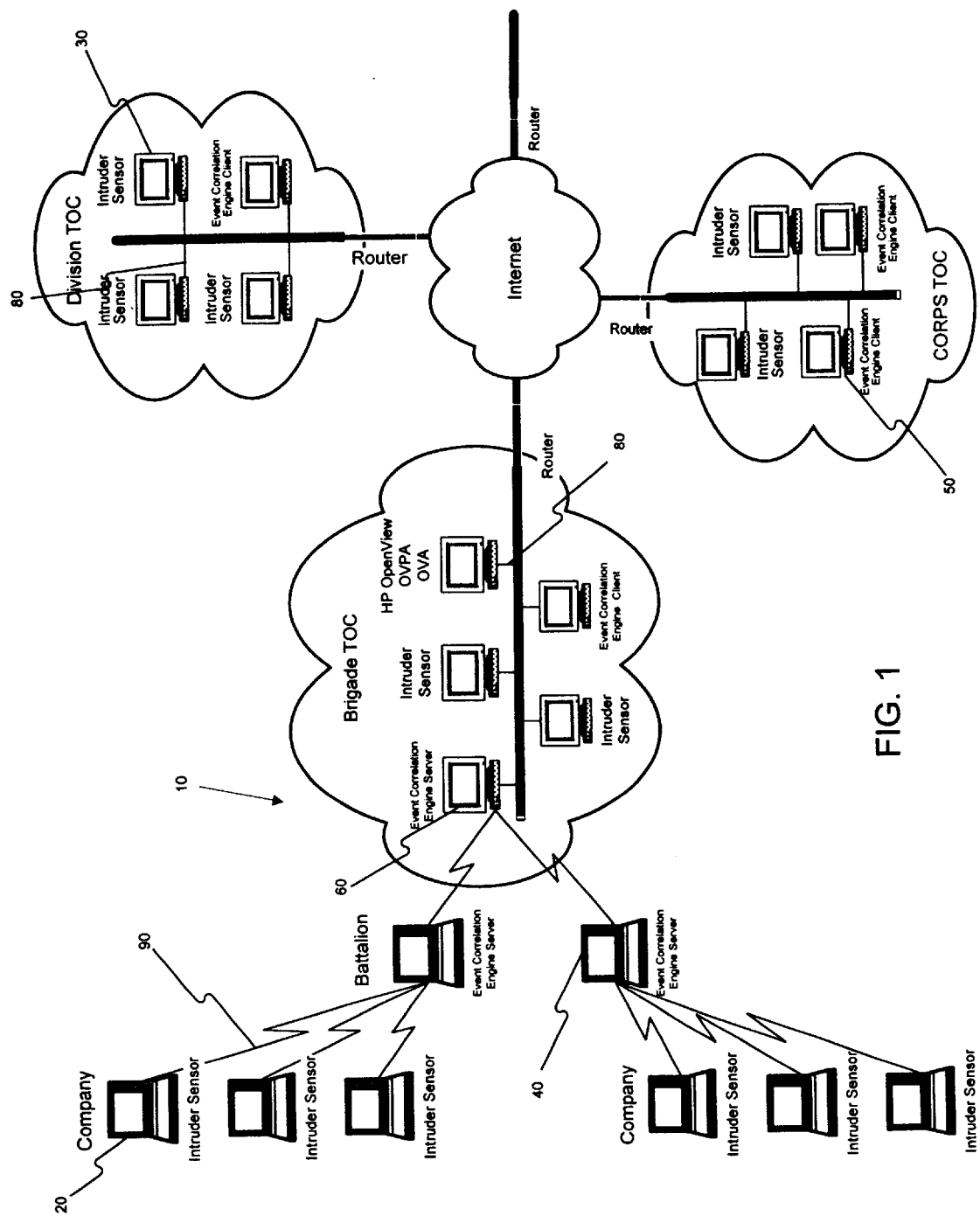
FIG. 1 is a block diagram of a computer network including an arrangement constructed in accordance with the subject invention for detecting and reporting computer system intruders.

A computer system in accordance with the present invention, comprises a plurality of intruder sensor client computers and associated event correlation engines. The event correlation engine may be generally similar to the client computers including a central processing unit, display device and operator input device. Moreover, it will be appreciated that a client computer may also perform operations described herein as being performed by an event correlation engine, and similarly an event correlation engine may also perform operations described herein as being performed by a client computer. The distributed computer system may comprise any one of a number of types of networks over which client computers and server computers communicate, including local area networks (LANs), wide area networks (WANs), the Internet and any other networks that distribute processing and share data among a plurality of nodes.

In operation, the client computer receives input from a network user and issues commands to other network resources over a wired or wireless network connection. Resident in the memory of the client computer and operating in the background is a Tactical Internet Device Protection (TIDP) component consisting of a passive intruder detector and a security MIB (Management Information Base). The TIDP passively monitors operations performed on the client computer and emits a special SNMP (Simple Network Management Protocol) trap to an event correlation engine when the TIDP component identifies a suspected intruder. Each object identifier contains an SNMP variable that indicates or identifies the parameter transmitted and a data portion containing the actual value of the parameter. SNMP traps are transmitted along the network as UDP (User Datagram Protocol) messages. UDP is a transport layer protocol that controls the packetizing of information to be transmitted, the reassembly of received packets into the originally transmitted information, and the scheduling of transmission and reception of packets. The security MB is comprised of a plurality of objects, each containing a variable or a parameter that fully describes the operating history of the client computer including a chronology of the illegal operations performed on the client.

More specifically, the TRDP component monitors a user's failed logon attempts, efforts to access protected areas of internal memory and attempts to access restricted programs from unauthorized client workstations. Whenever the TIDP component observes an event of interest, it immediately creates a trap message comprising a time-stamped representation of the observed activity in accordance with the SNMP protocol. Next, it transmits the trap message to its associated event correlation engine in conformance with UDP protocol.

Resident in the memory of the event correlation engine is a behavior model database for accurately assessing the presence of an intruder based on information received from the client computer. Any commercial off-the-shelf event management system can host the behavior model database operating on the event correlation engine. A modified version of the Seagate NerveCenter™ event management software system has also proven to be adequate. Each behavior model is comprised of a set of rules designed to classify a received trap message as benign, inconclusive, or indicative of an intruder. As was discussed earlier, event correlation engines on the network can be located in widely dispersed locations and therefore subject to differing security concerns. In essence, intruder sensors located at the lowest levels of an organization will undoubtedly face different security threats than those at the highest levels. It is therefore likely that each behavior model will correspondingly be unique.

When the event correlation engine determines that an intruder at an associated client workstation is attempting to access the network, it generates a status message and transmits the message to all of its subscribers (associated clients and servers), informing them of the presence and location of a suspected intruder. In the case that the event correlation engine determines that the trap message is inconclusive, it may transmit a SNMP request back to the client computer for additional information from its security MIB. Once the requested information is received by the event correlation engine, it will again attempt to classify the trap message in light of the new information. This process continues until the nature of every trap message is determined.

The network subscribers are CORBA (Common Object Request Broker Architecture) based processes that facilitate an extremely fast notification process for all network subscribers regardless of hardware platform, operating system, location or vendor.

It is to be understood that both the foregoing general description and the following detailed description are exemplary and explanatory only and are not restrictive of the invention, as claimed.

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Detailed Description

Referring to FIG. 1, a computer network system 10, is comprised of a plurality of interconnected computers and microprocessors hosting a single operating system. By way of example, the network can operate using Windows/NT, UNIX or Windows/CE. The computers depicted in FIG. 1 are connected to the network 10 either through a hard-wired interface 80 or a wireless interface 90. As is shown in FIG. 1, intruder sensors 20 are connected to the network via a wireless interface 90 while intruder sensors 30 utilize a hard-wired interface 80 to couple to the network. Devices coupled to the network via a wireless interface 90 communicate with rest of the network 10 over the airwaves at radio frequencies while devices coupled to the network via a hard-wired interface 80 communicate with the rest of the computer network 10 over a wire or fiber optic medium. Event correlation engines 60 may utilize either a wired or a wireless medium for communicating, depending on the desired destination of the transmitted information. When communicating through radio frequency modulation instead of via a hard wire, any suitable transmission wavelength can be selected.

Figure 2:
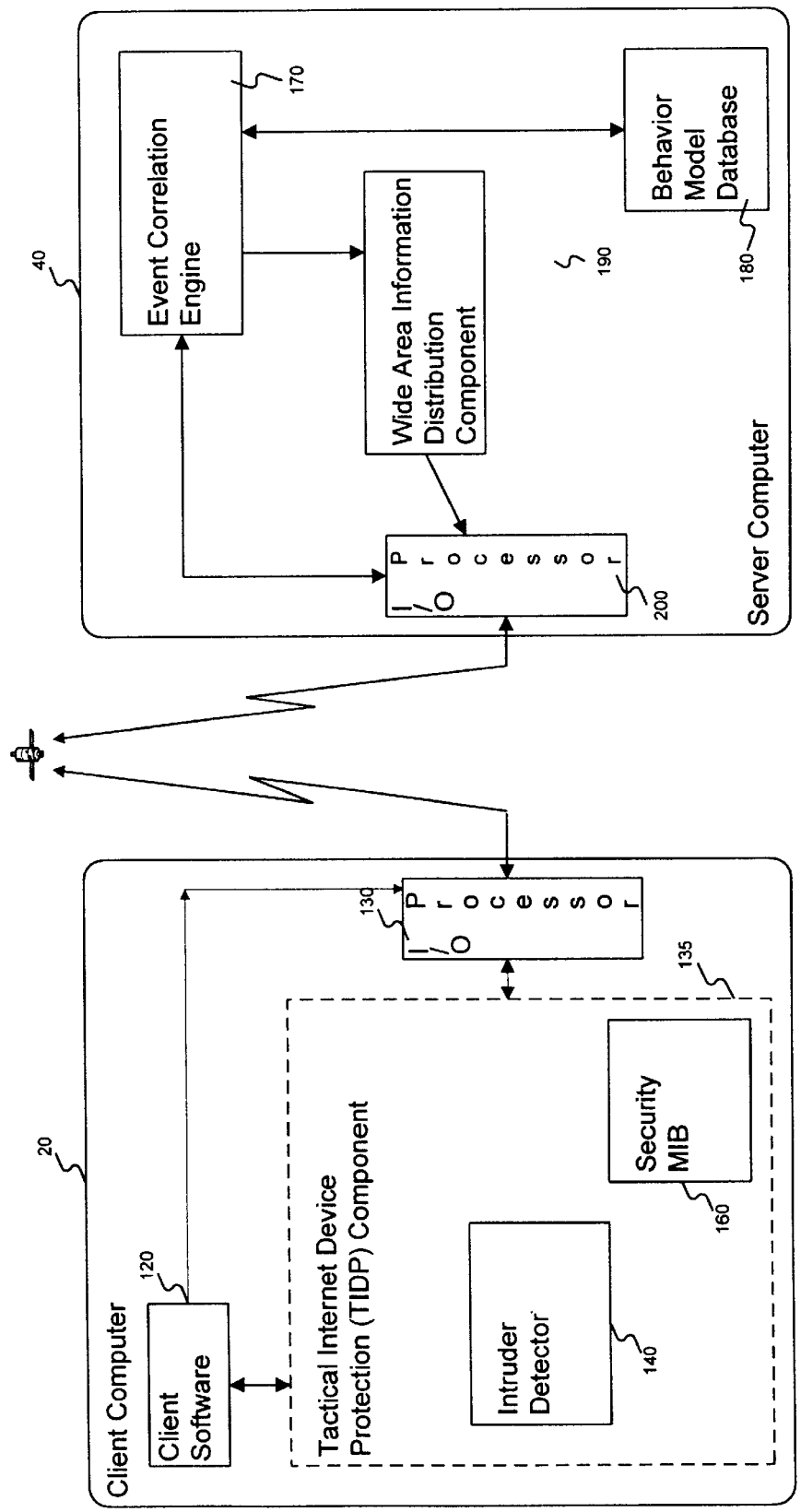
FIG. 2 is a more detailed block diagram of the intruder sensor client and event correlation engine of FIG. 1.

As shown in FIG. 2, the Tactical Internet Device Protection (TIDP) component 135, refers to a software process or set of processes that run in the background on intruder sensor clients 20 and 30. The TIDP component passively monitors operations performed on the intruder sensor clients 20 and 30, and emits a special SNMP (Simple Network Management Protocol) trap to an event correlation engine 40 when the intruder detector 140 identifies a suspected intruder. Each SNMP trap transmitted to the event correlation engine from the intruder sensor is automatically merged with data regularly transmitted by the client software 120 in the input/output processor 130. Each trap message is comprised of client identifier information, a time stamp and an object identifier that indicates or identifies the parameter transmitted and a data portion containing the actual value of the parameter.

Event correlation engines 40, 50 and 60, and event correlation engine clients 70 host a software process or set of processes to be described later, that interface with the intruder sensor client 20 and 30 to confirm the identification of a suspected intruder. Event correlation engines 40 are connected to the network via a wireless interface 90, event correlation engines 50 are connected to the network via a hard-wired interface 80 and event correlation engines 60 are connected to the network via both a wireless and a wired interface. Although five different devices are depicted, it should be apparent to those of ordinary skill in the art that any number of devices can populate the computer network.

Each intruder sensor client (20 and 30) is configured to allow single-user access to the network upon user authentication to the client. When a user is attempting to access the network, the TIDP component 135, as shown in FIG. 2, monitors user inputs with the goal of detecting a potential network intruder as early as possible. Once a user is granted access to the network via an intruder sensor client (20 and 30), the TIDP component 135 continues to monitor operations on the intruder sensor client in order to quickly identify user activities that may indicate the presence of an intruder. As illustrated in FIG. 2, each TIDP component 135 is comprised of a client software module 120, an intruder detector 140 and a security MIB (Management Information Base) 160.

Figure 3:
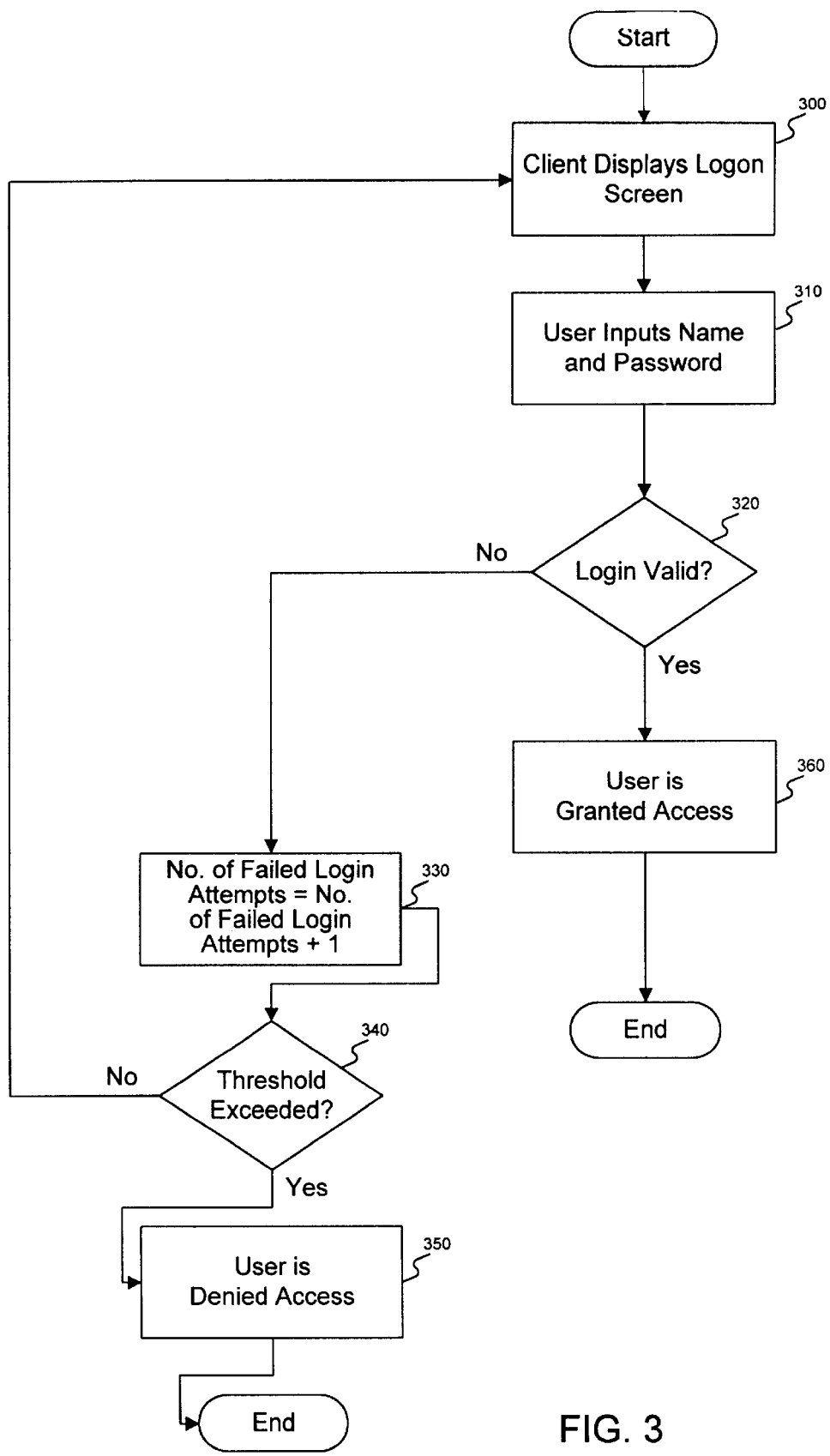
FIG. 3 is a flow chart showing the operation of the TIDP when a user attempts to log onto the network.

As shown in FIG. 3, when a user at an intruder sensor client (20 and 30) attempts to log onto the computer network, the client software 120 operating on the workstation presents a logon screen to the user in step 300. In step 310, the user initiates an attempt to gain access by entering a user name and password into the client computer. The client software 120 operating on the intruder sensor client computer (20 and 30) captures the user's inputs and attempts to verify the user's login in step 320. If the login is correct, processing passes to step 360 and the user is granted access to the network. If the login is not correct, processing passes to step 330 where a counter increments the number of failed login attempts since the last successful login. Next, in step 340 the client software 120 determines whether the number of failed login attempts exceeds a database limit. If the limit is exceeded, processing passes to step 350 and network access to the user is denied. Otherwise, processing branches back to step 300 and the user is again presented with a login screen. In an alternate embodiment, the intruder detector and reporting system may instead utilize the event correlation engine 170 to determine whether to grant a user access to the network. For example, instead of denying a user access, the TIDP may instead transmit the logon information to the event correlation engine 170 for analysis. The behavior model 180 would then examine the number of failed logon attempts, the period of time since the last failed login attempt and/or the degree of error between the entered password and the actual password to properly characterize the observed data as either indicative of a legitimate user or that of an intruder.

Under normal operating conditions, the intruder detector 140 portion of the TIDP component 135 monitors the client software processing in the background and returns feedback to the TIDP component 135 when certain activities are observed. For example, the intruder detector 140 can monitor and feed back information on failed login responses (as was previously discussed), information on attempted user accesses to protected areas of memory, information on attempted user accesses to restricted application programs, the time of the last grant of network access, and/or the time of the last denial of network access. When the intruder detector 140 of the TIDP component 135 observes a qualifying event, it passes the data to the security MIB 160 for storage and later retrieval, if necessary. In the event that the information indicates a failed login request, the TIDP component 135 would additionally transmit a SNMP (Simple Network Management Protocol) trap to its associated event correlation engine (40, 50 or 60) via the input/output processor 130, for a further determination of the user's status as an intruder.

Once the user has been granted access to the network 10, the THDP component 135 continues to monitor the client software 120 for any indication that the logged-on user is actually an intruder or that a legitimate user has been replaced by an intruder. In essence, if an intruder is somehow able to circumvent the logon system or otherwise gain access to a legitimately logged-on intruder sensor client (20 and 30), the TIDP component 135 will monitor the user's activities to update the user's status and inform the rest of the network.

Figure 4:
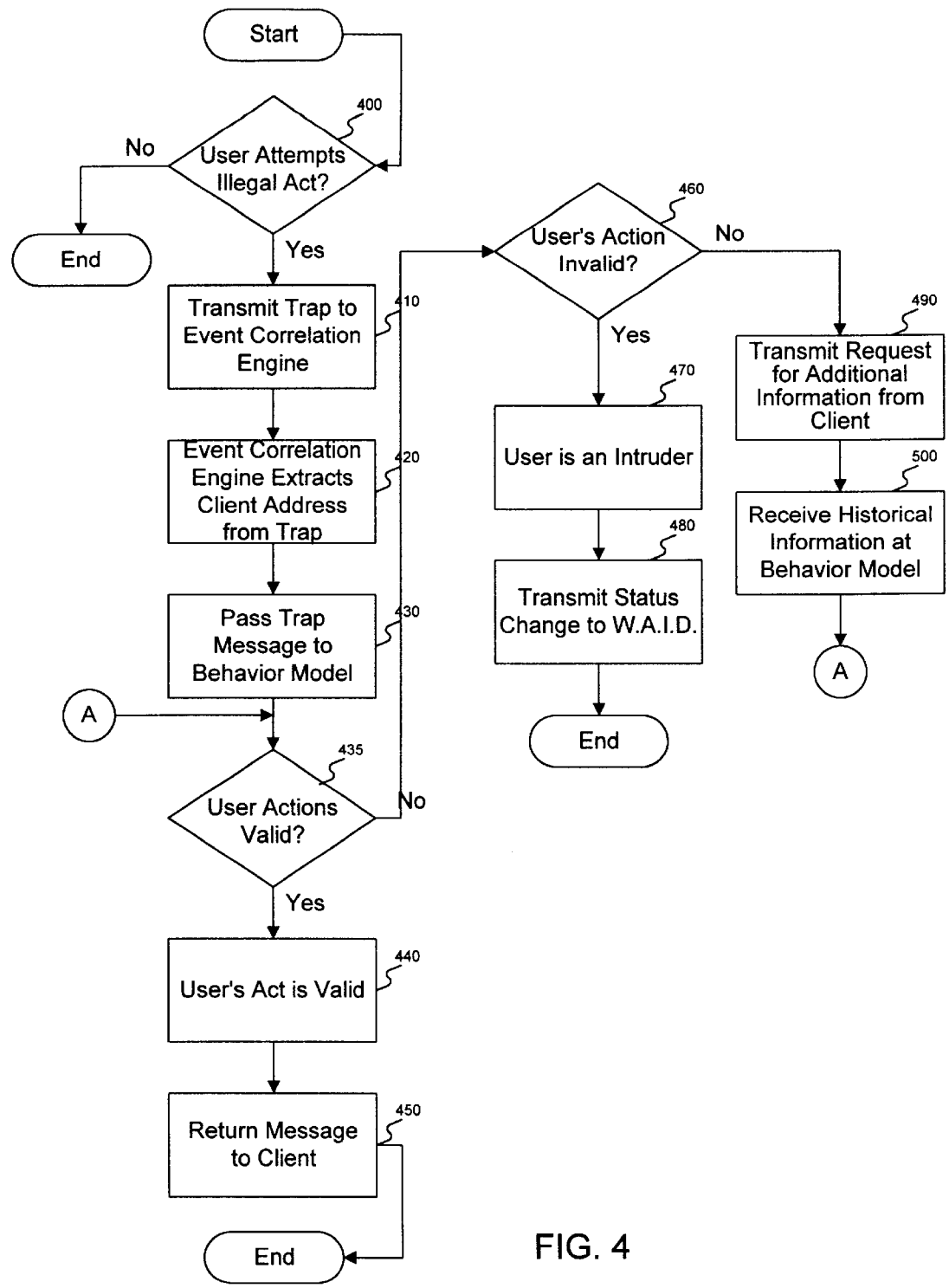
FIG. 4 is a flow chart showing the operation of the system as the TIDP component monitors normal operations of the client computer.

As shown in FIG. 4, if a logged-on user attempts to access a protected area of memory or if the user attempts to perform an illegal task (Step 400), the TIDP component 135 in step 410 would transmit the trap information to the event correlation engine (40, 50, 60) for an updated determination of the user's status in light of his/her latest network activities.

When a trap message is transmitted from a TIDP component 135, it is received by the associated event correlation engine (40, 50, or 60). As shown in FIG. 2, each event correlation engine is comprised of an event correlation engine software processing system 170, a behavior model database 180, a Wide Area Information Distribution component 190 and an input/output processor 200. Each trap message is received at the associated event correlation engine (40, 50 or 60) by its event correlation engine processing software 170. Since each event correlation engine is associated with a plurality of intruder sensor clients, the event correlation engine processing software must first associate the trap message with the proper intruder sensor (20 and 30) as shown in step 420. As was discussed earlier, each trap is comprised of among other things, client identifier information to facilitate the proper association of the data. Once the trap message has been properly associated with the appropriate intruder sensor, processing passes to the behavior model 180 (step 430). The behavior model is a rule-based, event correlation system that allows the event correlation engine processing software 170 to quickly and automatically identify intruders on the network. The behavior model hosted on each event correlation engine (40, 50 and 60) may contain any number of rules to evaluate the propriety of a particular user. Also, different event correlation engines (40, 50, and 60) may include behavior models that contain different rules, depending on the type of user behavior that its associated event correlation engine (40, 50 and 60) is trying to identify. For example, one rule in a particular behavior model may state that an "Intruder=a user who fails to enter a correct password in five consecutive attempts" while a different behavior model hosted on another event correlation engine (40, 50 and 60) with a higher security requirement may classify an intruder as "a user who fails to enter a correct password in two consecutive attempts." Each behavior model may contain a large number of rules, that together create a very complex filtering scheme.

If the behavior model database 180 determines that the user's actions do not fit the profile for a network intruder (step 435), the user's actions will be declared valid (step 440) and a confirmatory message will be returned to the client (step 450). If the observed data meets or exceeds the threshold set in the behavior model as shown in step 460, the prospective user will be declared an intruder (step 470) and access to the network denied. If the behavior model 180 determines that a user's status cannot be conclusively determined from the observed data, it may query the subject intruder sensor client for more information on the suspected activity by transmitting an SNMP Get Request to the intruder sensor client (step 490). Upon receipt of an SNMP Get Request, the TIDP component 135 will retrieve the requested information from the security MIB and transmit the data back to the event correlation engine for further processing (step 500). When the behavior model receives the new information, it again attempts to evaluate the user's status. This recursive process of receiving new information and supplementing it with historical information to help resolve inconclusive behavior continues until the behavior model has enough information to accurately characterize the user's action as either benign or that of an intruder. In the preferred embodiment, the behavior model is a version of the Seagate NerveCenter system or similar commercial off-the-shelf network management system.

Once the behavior model 180 has determined that an intruder is accessing or attempting to access an intruder sensor client (20 and 30), the event correlation engine software processing system 170 transmits a status change message to the Wide Area Information Distribution (WAID) component 190 (step 480). The WAID provides a transport mechanism for disseminating the status change throughout the network and it takes the proper steps to respond to the identified intruder. The WAID component 190 and the TIDP component 135 are Common Object Request Broker Architecture (CORBA) based processes that facilitate an extremely fast notification process for all network subscribers regardless of hardware platform, operating system, location or vendor.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Also, while there have been shown what are presently considered to be preferred embodiments of the invention, it will be apparent to those skilled in the art that various changes and modifications can be made herein without departing from the scope of the invention as defined by the appended claims.

What is claimed is:

1. A method in an intruder detector system having a plurality of clients and an event correlation engine, the method comprising the steps of:

receiving a trap message by the event correlation engine, said trap message indicating that a suspected intruder is accessing a first client and including client identifier information, a time stamp, and an object identifier specifying a transmitted parameter and a data portion including a value of the parameter; and transmitting a status change from said event correlation engine, said status change informing a second client of the location of said suspected intruder.

2. The method of claim 1, said step of receiving a trap message further comprising the step of extracting the source of the trap message from said trap message.

3. The method of claim 1, said step of receiving a trap message by said event correlation engine further comprising the step of confirming that an operation performed on the first client is indicative of an intruder.

4. The method of claim 3, said confirming step further comprising the steps of:
- accessing a behavior model database stored on said event correlation engine;
- comparing said trap message to at least one of a plurality of behavior model rules stored in said behavior model database; and
- declaring that an operation performed on the first client is indicative of an intruder operating on the client when said trap message exceeds a threshold level in said at least one of a plurality of behavior model rules.

5. The method of claim 4, said declaring step further comprising the steps of:
- determining whether said trap message is at least a second identical occurrence of said trap message; and
- concluding that an operation is indicative of an intruder operating on the client when said trap message is at least a second identical occurrence.

6. The method of claim 4, said confirming step further comprising the steps of:
- transmitting a request for additional information from said event correlation engine to the first client;
- retrieving information from a security Management Information Base (MIB) stored on the first client; and
- transmitting a response from the first client to said event correlation engine.

7. A method for passively detecting and reporting the presence of an intruder on a computer network comprising an event correlation engine and an intruder sensor operating on a client, said method comprising the steps of:
- monitoring a plurality of operations on the client by the intruder sensor;
- determining whether at least one of said plurality of operations indicates that a suspected intruder is accessing the client; and
- transmitting a trap message to an event correlation engine, said trap message indicating that said suspected intruder is accessing the client and including client identifier information, a time stamp, and an object identifier specifying a transmitted parameter and a data portion including a value of the parameter.

8. The method of claim 7, said monitoring step further comprising the step of detecting unsuccessful logon attempts to the client.

9. The method of claim 8, said determining step further comprising the step of assessing the presence of an intruder when a number of detected unsuccessful logon attempts exceeds a threshold value.

10. The method of claim 7, said monitoring step further comprising the step of detecting attempted user accesses to protected memory locations.

11. The method of claim 10, said determining step further comprising the step of assessing the presence of an intruder when a number of detected attempted user accesses to protected memory locations exceeds a threshold value.

12. The method of claim 7, said monitoring step further comprising the step of detecting attempted user accesses to restricted applications.

13. The method of claim 12, said determining step further comprising the step of assessing the presence of an intruder when said detected attempted user accesses to protected memory exceeds a threshold value.

14. The method of claim 7, said transmitting step further comprising the step of transmitting said trap message over a wireless network.

15. The method of claim 7, said monitoring step is performed in the background.

16. A method for passively detecting and reporting the presence of an intruder on a computer network comprising an event correlation engine and a plurality of client computers with intruder sensors, said method comprising the steps of:
- monitoring a plurality of operations on at least one of said plurality of client computers;
- determining whether at least one of said plurality of operations indicates that a suspected intruder is accessing at least one of said plurality of client computers;
- transmitting a trap message by the intruder sensor to an event correlation engine, said trap message indicating the presence of said suspected intruder on the client computer and including client identifier information, a time stamp, and an object identifier specifying a transmitted parameter and a data portion including a value of the parameter;
- receiving the trap message by the event correlation engine;
- determining whether said suspected intruder is accessing the client computer; and
- if said suspected intruder is detected, transmitting a status change from said event correlation engine to said plurality of client computers, said status change informing said plurality of clients of the location of said suspected intruder.

17. The method of claim 16 wherein said status change is not transmitted to the suspected intruder.

18. The method of claim 17, said step of transmitting a status change is comprised of the step of transmitting the status change over a wired and a wireless computer network.

19. A distributed system for passively detecting and reporting the presence of an intruder, comprising:
- an event correlation engine with a plurality of associated client computers;
- an associated server computer; and
- an intruder sensor operating in the background on said client computers that monitors a plurality of operations and transmitting a trap message to the associated server computer whenever said plurality of operations indicates the presence of a suspected intruder on the client, wherein said trap message includes client identifier information, a time stamp, and an object identifier specifying a transmitted parameter and a data portion including a value of the parameter,
- said server computer including a component for transmitting a status change to said plurality of client computers for informing said plurality of clients of the location of said suspected intruder.

20. The distributed system of claim 19 wherein said status change is not transmitted to the suspected intruder.

21. A system for passively detecting and reporting the presence of an intruder on a computer network containing an event correlation engine and a plurality of client computers with intruder sensors, the system comprising:
- means for monitoring a plurality of operations on at least one of said plurality of client computers;
- means for determining whether at least one of said plurality of operations indicates that an intruder is accessing at least one of said plurality of client computers;
- means for transmitting a trap message by the intruder sensor to an event correlation engine, said trap message indicating the presence of a suspected intruder on the client computer and including client identifier information, a time stamp, and an object identifier specifying a transmitted parameter and a data portion including a value of the parameter;

means for receiving the trap message by the event correlation engine;

means for determining that an intruder is accessing the client computer; and means for transmitting a status change from said event correlation engine to said plurality of client computers, said status change informing said plurality of clients of the location of said intruder.

22. An intruder sensor software system for detecting and reporting the presence of an intruder on a computer network comprising a plurality of interconnected clients and servers, said software system comprising:

an event correlation engine operating on at least one of said servers;

a Tactical Internet Device Protection (TIDP) component operating on a client computer, said TIDP component passively monitoring operations on said client computer and transmitting a trap message to said event correlation engine in the event that an intruder is suspected on the client, wherein said trap message includes client identifier information, a time stamp, and an object identifier specifying a transmitted parameter and a data portion including a value of the parameter.

23. An intruder sensor software system according to claim 22, said event correlation engine further comprises a behavior model database for confirming the presence of an intruder on said client computer.

24. An intruder sensor software system according to claim 23, said behavior model database further comprises a plurality of rules for determining the presence of an intruder.

25. An intruder sensor software system according to claim 22, said event correlation engine further comprises a means for transmitting a request for additional information to said TIDP component.

26. An intruder sensor software system according to claim 22, said event correlation engine further comprises a Wide Area Information Distribution component for transmitting a status change to said plurality of clients and servers.

27. An intruder sensor software system according to claim 22, said TIDP component further comprises a security MIB for storing additional information that fully describes the operating history of a client computer.

28. An intruder sensor software system according to claim 22, said trap message further comprises an object identifier and a data portion.

29. An intruder sensor software system according to claim 22, said trap message is a SNMP trap message.

30. An intruder sensor software system according to claim 22 wherein each of said clients and servers are comprised of a CORBA interface.

31. A method in a passive intruder detector system having a plurality of clients and an event correlation engine, the method comprising the steps of:

receiving a trap message by the event correlation engine, said trap message indicating that a suspected intruder is accessing a first client and including client identifier information, a time stamp, and an object identifier specifying a transmitted parameter and a data portion including a value of the parameter; and transmitting a status change from said event correlation engine, said status change informing a second client of the location of said suspected intruder.

32. The method of claim 31, said step of receiving a trap message further comprising the step of extracting the source of the trap message from said trap message.

33. The method of claim 31, said step of receiving a trap message by said event correlation engine further comprising the step of confirming that an operation performed on the first client is indicative of an intruder.

34. The method of claim 33, said confirming step further comprising the steps of:

accessing a behavior model database stored on said event correlation engine;

comparing said trap message to at least one of a plurality of behavior model rules stored in said behavior model database; and declaring that an operation performed on the first client is indicative of an intruder operating on the client when said trap message exceeds a threshold level in said at least one of a plurality of behavior model rules.

35. The method of claim 33, said confirming step further comprising the steps of:

determining whether said trap message is at least a second identical occurrence of said trap message; and declaring that an operation is indicative of an intruder operating on the client when said trap message is at least a second identical occurrence.

36. The method of claim 33, said confirming step further comprising the steps of:

transmitting a request for additional information from said event correlation engine to the first client;

retrieving information from a security Management Information Base (MIB) stored on the first client; and transmitting a response from the first client to said event correlation engine.

37. A method for passively detecting and reporting the presence of an intruder on a computer network comprising an event correlation engine and an intruder sensor operating on a client, said method comprising the steps of:

monitoring a plurality of operations on the client by the intruder sensor;

determining whether at least one of said plurality of operations indicates that a suspected intruder is accessing the client; and transmitting a trap message to an event correlation engine, said trap message indicating that said suspected intruder is accessing the client and including client identifier information, a time stamp, and an object identifier specifying a transmitted parameter and a data portion including a value of the parameter.

38. The method of claim 37, said monitoring step further comprising the step of detecting unsuccessful logon attempts to the client.

39. The method of claim 38, said determining step further comprising the step of assessing the presence of an intruder when a number of detected unsuccessful logon attempts exceeds a threshold value.

40. The method of claim 37, said monitoring step further comprising the step of detecting attempted user accesses to protected memory locations.

41. The method of claim 40, said determining step further comprising the step of assessing the presence of an intruder when a number of detected attempted user accesses to protected memory locations exceeds a threshold value.

42. The method of claim 37, said monitoring step further comprising the step of detecting attempted user accesses to restricted applications.

43. The method of claim 42, said determining step further comprising the step of assessing the presence of an intruder when said detected attempted user accesses to protected memory exceeds a threshold value.

44. The method of claim 37, said transmitting step further comprising the step of transmitting said trap message over a wireless network.

45. The method of claim 37, said monitoring step is performed in the background.

* * * * *